United States Patent
Umapathy et al.

(10) Patent No.: US 9,628,414 B1
(45) Date of Patent: Apr. 18, 2017

(54) USER STATE BASED ENGAGEMENT

(71) Applicant: Google Inc., Mountain View, CA (US)

(72) Inventors: Vijay Umapathy, Sunnyvale, CA (US);
Kathleen Ko, San Francisco, CA (US)

(73) Assignee: Google Inc., Mountain View, CA (US)

( * ) Notice: Subject to any disclaimer, the term of this patent is extended or adjusted under 35 U.S.C. 154(b) by 344 days.

(21) Appl. No.: 13/843,329

(22) Filed: Mar. 15, 2013

(51) Int. Cl.
   H04L 12/58      (2006.01)
   H04L 29/08      (2006.01)
   G06Q 30/02      (2012.01)
   G06F 17/30      (2006.01)

(52) U.S. Cl.
   CPC ........ H04L 51/04 (2013.01); *G06F 17/30867* (2013.01); *G06Q 30/0224* (2013.01); *H04L 12/586* (2013.01); *H04L 29/08675* (2013.01); *H04L 51/16* (2013.01); *H04L 67/22* (2013.01)

(58) Field of Classification Search
   USPC ...... 463/25, 29, 42; 709/206, 204, 205, 217, 709/218, 219
   See application file for complete search history.

(56) References Cited

U.S. PATENT DOCUMENTS

| | | | | |
|---|---|---|---|---|
| 4,866,707 A * | 9/1989 | Marshall | ............... | H04L 1/1874 370/216 |
| 6,205,498 B1 * | 3/2001 | Habusha | ................. | H04L 47/10 379/229 |
| 6,446,144 B1 * | 9/2002 | Habusha | ................. | H04L 47/10 379/229 |
| 8,311,041 B1 * | 11/2012 | Nerieri | .................... | H04L 51/12 370/328 |
| 8,457,108 B1 * | 6/2013 | Croak | ..................... | H04L 43/04 370/352 |
| 8,875,062 B1 * | 10/2014 | Umapathy | ............. | G06Q 30/02 715/744 |
| 8,914,741 B1 * | 12/2014 | Akers | ..................... | G06F 3/048 715/744 |
| 9,021,048 B2 * | 4/2015 | Luna | ...................... | H04L 67/22 709/213 |
| 2002/0087643 A1 * | 7/2002 | Parsons | ................... | G06F 9/542 709/206 |
| 2003/0177008 A1 * | 9/2003 | Chang | .................... | G10L 17/26 704/255 |
| 2004/0009813 A1 * | 1/2004 | Wind | .............................. | 463/30 |

(Continued)

*Primary Examiner* — Backhean Tiv
(74) *Attorney, Agent, or Firm* — McDermott Will & Emery LLP

(57) ABSTRACT

The subject technology discloses configurations, for a set of unique users, processing application usage logs to determine a set of features of an application accessed by each user. A respective profile of each user is then updated based on the determined set of features accessed by the set of unique users. The subject technology determines a set of users that have lapsed in usage of an application based on a respective profile of each user. One or more previous engagement messages sent to the determined set of users are determined. The subject technology ranks a set of engagement types for each user of the determined set of users based on a set of criteria including the determined previous engagement messages. A new engagement message is generated based on a selected engagement type and then transmitted to each user of the determined set of users.

19 Claims, 4 Drawing Sheets

(56) References Cited

U.S. PATENT DOCUMENTS

| | | | |
|---|---|---|---|
| 2005/0078660 A1* | 4/2005 | Wood | H04L 12/5692 370/352 |
| 2006/0128404 A1* | 6/2006 | Klassen | H04L 12/586 455/466 |
| 2007/0016672 A1* | 1/2007 | Wilson | G06F 9/542 709/224 |
| 2007/0214228 A1* | 9/2007 | Horvitz et al. | 709/207 |
| 2008/0005732 A1* | 1/2008 | Coon | G06F 8/65 717/168 |
| 2008/0250323 A1* | 10/2008 | Huff | G06F 9/4446 715/733 |
| 2009/0013041 A1* | 1/2009 | Farmer et al. | 709/204 |
| 2010/0331064 A1* | 12/2010 | Michelstein | G06Q 10/10 463/1 |
| 2011/0014972 A1* | 1/2011 | Herrmann | G06Q 30/0224 463/25 |
| 2011/0028138 A1* | 2/2011 | Davies-Moore | G06F 3/04817 455/418 |
| 2011/0055378 A1* | 3/2011 | Ferris et al. | 709/224 |
| 2011/0154109 A1* | 6/2011 | Levine | G06F 8/70 714/26 |
| 2012/0059937 A1* | 3/2012 | Dheap | H04L 47/10 709/226 |
| 2013/0024524 A1* | 1/2013 | Graff | G06Q 50/20 709/206 |
| 2013/0072160 A1* | 3/2013 | Lawson | H04L 63/102 455/411 |
| 2013/0080543 A1* | 3/2013 | Jang | 709/206 |
| 2013/0167196 A1* | 6/2013 | Spencer | H04W 8/22 726/3 |
| 2013/0290359 A1* | 10/2013 | Eronen | G06F 17/30 707/758 |
| 2013/0339874 A1* | 12/2013 | Yamaguchi | H04L 51/00 715/752 |
| 2015/0032415 A1* | 1/2015 | Van Cutsem | G06F 8/77 702/187 |
| 2015/0195179 A1* | 7/2015 | Skare | H04L 43/16 715/745 |

* cited by examiner

USER STATE BASED ENGAGEMENT

BACKGROUND

E-mail marketing campaigns send mass e-mails to users. However, mass e-mails may not be targeted to users in an intelligent manner, which may result in a poor click-through rate.

SUMMARY

The subject technology includes a machine-implemented method that provides determining a set of users that have lapsed in usage of an application based on a respective profile of each user; determining one or more previous engagement messages sent to the determined set of users; ranking a set of engagement types for each user of the determined set of users based on a set of criteria including the determined one or more previous engagement messages; selecting an engagement type from among the ranked set of engagement types for each user of the determined set of users; generating a new engagement message based on the selected engagement type for each user of the determined set of users; and transmitting the generated new engagement message to each user of the determined set of users by utilizing one or more communication channels.

In some configurations, determining the set of users that have lapsed is based on a predetermined period of time. Each of the previous engagement messages corresponds to a respective engagement type. The respective engagement type comprises a customized message including graphics, text or auto-generated content that promotes one or more features of the application. The set of criteria further includes an indication of a number of the previous engagement messages according to engagement type that resulted in a successful engagement by a user. The engagement type is selected based on a highest click-through rate among one or more features of the application. The one or more communication channels comprise one of an e-mail, mobile application notification, web application notification, push notification or SMS message. The respective profile of each user includes one or more user actions performed in the application. The user actions include Boolean flags that indicate whether a user has used a feature from among the set of features of the application. The application is provided by a web site. The respective profile of each user is stored in a user data store.

The subject technology further includes a system. The system includes memory, one or more processors, one or more modules stored in memory and configured for execution by the one or more processors. The system includes a user data aggregator module configured to, for a set of unique users, process application usage logs to determine a set of features of an application accessed by each user of the set of unique users, and update a respective profile of each user of the set of unique users based on the determined set of features accessed by the set of unique users. The system further includes an engagement scheduler module configured to determine a set of users that have lapsed in usage of an application based on a respective profile of each user, determine one or more previous engagement messages sent to the determined set of users, rank a set of engagement types for each user of the determined set of users based on a set of criteria including the determined one or more previous engagement messages, and select an engagement type from among the ranked set of engagement types for each user of the determined set of users.

The engagement scheduler module is further configured to generate a new engagement message based on the selected engagement type for each user of the determined set of users. The engagement scheduler module is further configured to transmit the generated new engagement message to each user of the determined set of users by utilizing one or more communication channels.

The subject technology further provides a non-transitory machine-readable medium including instructions stored therein, which when executed by a machine, cause the machine to perform operations including: determining a set of users that have lapsed in usage of an application based on a respective profile of each user; determining one or more previous engagement messages sent to the determined set of users; ranking a set of engagement types for each user of the determined set of users based on a set of criteria including the determined one or more previous engagement messages; selecting an engagement type from among the ranked set of engagement types for each user of the determined set of users; generating a new engagement message based on the selected engagement type for each user of the determined set of users; and transmitting the generated new engagement message to each user of the determined set of users by utilizing one or more communication channels.

These and other implementations may provide one or more of the following advantages: fewer engagements can be sent to a much more targeted audience, and ultimately these engagements become a part of the application experience rather than a one-off, forced "marketing" effort. Additionally, the subject technology is a fully automated state machine that does not require human-defined campaigns, and each user receives a customized experience based on his or her usage of the application over time. Furthermore, the subject technology utilizes feedback channels to automatically learn a better strategy to engage each individual user over time.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

Figure 1:
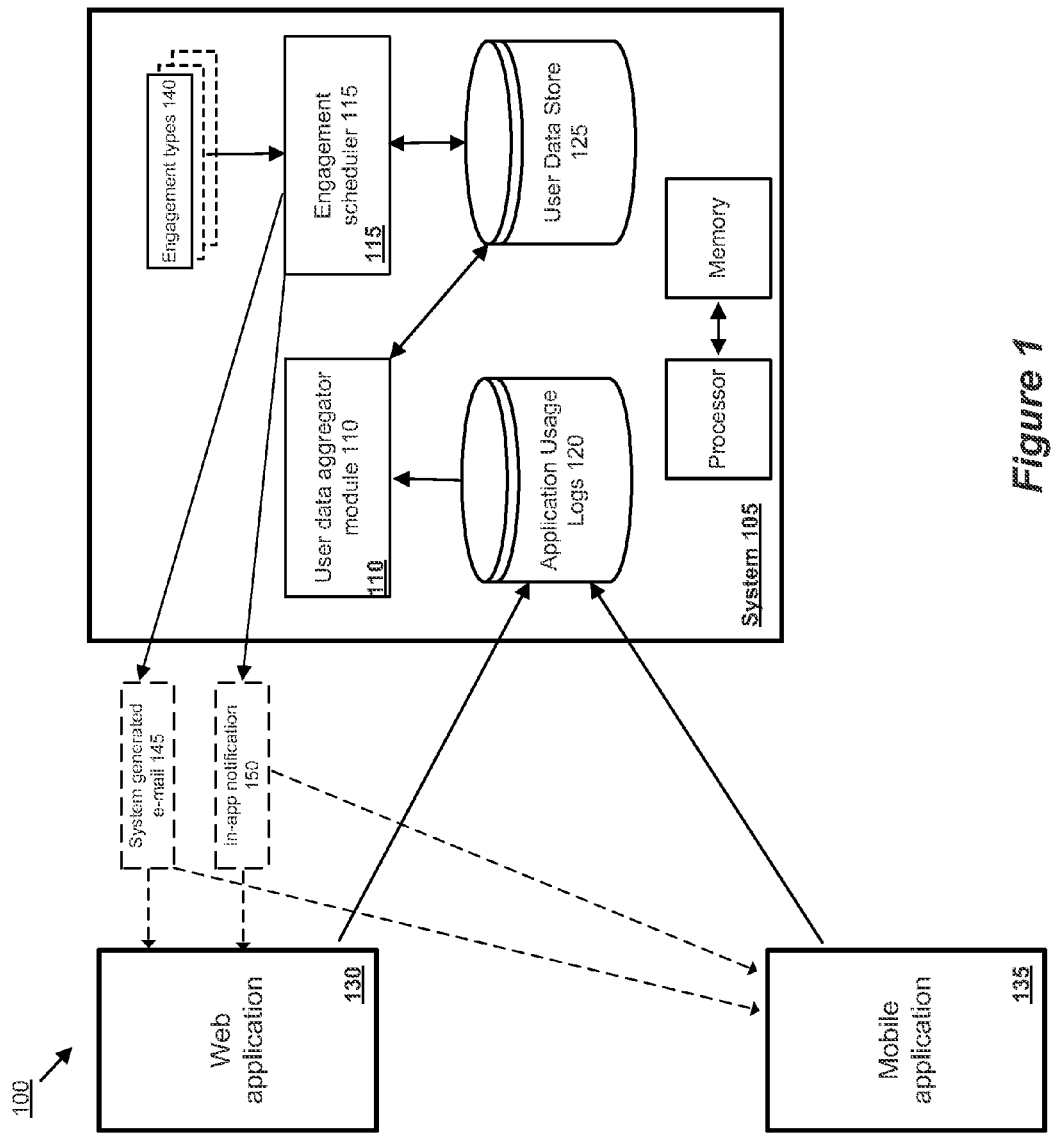
FIG. 1 conceptually illustrates an example computing environment in which some configurations of the subject technology can be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In a given online social network system, the online social network system may send out a vast number emails (e.g., hundreds of millions) to users that are lapsed and have not logged in or utilized the online social network system in a predetermined period of time (e.g., a week, several weeks, months, etc.). Such e-mails may promote the online social network system to attempt to entice the users to log into the system (e.g., by clicking on a link provided in the e-mail) and/or utilize one or more features of the system. However, such e-mails are not targeted in an intelligent way for each user, which may result in poor click-through rate for the e-mails. For example, an existing system may not utilize certain information about each user to target users in a more effective manner.

Application usage logs may include activity per user in an online social network system. In some configurations, the subject technology utilizes per-user information from such usage logs to more optimally target engagement messages for each user and determine a type of engagement message to send to each user in an automated way. As used herein, an engagement message may be any system-generated communication with a user across one or more communication channels, including but not limited to e-mail, in-application notifications in a web application, and/or push notifications to a mobile device that has a mobile application installed on the mobile device. Other types of communication channels and message types may be utilized and still be within the scope of the subject technology.

In some configurations, the subject technology provides N different engagement types that may be understood as customized interface templates including content (e.g., text, images, etc.) as well as including machine-defined content (e.g., posts that may be interesting for a specific user, suggested people or contacts to connect with, etc.). Each engagement message therefore may correspond to an engagement type. A profile is generated for each unique user based on each user's activity in the online social network system as included in the usage logs. Further, the subject technology may keep a historical record of past engagement messages and/or types that have been sent to each user. In this manner, the subject technology can utilize the historical record of past engagement messages/types to filter out one or more previously sent engagement types.

Based on information in the application usage logs for each unique user, user profile information, historical record of past engagement messages already sent, and/or other criteria, the subject technology ranks the N different engagement types and selects an engagement type based on the ranking. The subject technology may then send an engagement message according to the selected engagement type to a set of users that have been determined to have lapsed in an online social network system. Although the above description describes an online social network system, it should be appreciated that the configurations described herein may be applicable to improving the utilization of any application by effectively targeting users with engagement messages.

In some implementations, users may be provided with an opportunity to determine how programs or features use user information, or to determine whether and/or how to receive content from the content server that may be more relevant to the user. In addition, in some implementations, user information can be processed to obscure identity.

FIG. 1 conceptually illustrates an example computing environment 100 including a system. In some configurations, the system 105 is part of an implementation running a particular machine (e.g., server, client computer, laptop, notebook, netbook, etc.).

The system 105 can include memory, one or more processors, and one or more modules stored in memory and configured for execution by the one or more processors. As shown in FIG. 1, the system 105 includes several modules for providing different functionality. The system 105 is configured to include a user data aggregator module 110 and an engagement scheduler module 115.

As illustrated in FIG. 1, application usage logs 120 is a data store that stores usage logs which records user activity from a web application 130 and a mobile application 135. For instance, when a user performs an activity or action within the web application 130 or the mobile application 135, the activity is recorded into the application usage logs 120 (e.g., page visits, user actions/activity with corresponding timestamps, etc.). User actions may include page visits or asynchronous actions (e.g., JavaScript calls when a user presses a button on a given page). In an example in which the web application 130 and the mobile application 135 provide an interface for a given online social networking service, each activity recorded in the application usage logs 120 may correspond to different features in the online social network service such as, but not limited to, creating new posts/messages, sharing content, updating a user's profile and the information stored therein, adding contacts, viewing contacts, creating a group that shares common interests or affiliations, etc. Other types of features may be included and still be within the scope of the subject technology.

Additionally, other user activity corresponding to other types of applications may be stored in the application usage logs 120 and still be within the scope of the subject technology. For example, user activity from applications running on tablet devices, touch-sensitive devices, notebooks, netbooks, televisions, or wearable computing devices may be stored in the application usage logs 120.

In some configurations, the user data aggregator module 110 is configured continuously iterate over all unique users in the application usage logs 120 and update a profile for each user. More specifically, the user data aggregator module 110 is configured to, for a set of unique users, process application usage logs to determine a set of features of an application accessed by each user of the set of unique users, and update a respective profile of each user of the set of unique users based on the determined set of features accessed by the set of unique users. In one example, each profile of a unique user may include Boolean flags that indicate whether a user has used a given feature in the online social network system or application. With respect to covering features in the online social network system or application, the subject technology is extensible by allowing new or additional features to be added, as long as such features are based on information stored in the application usage logs 120. In one example, each user profile is stored in a separate data store shown as a user data store 125 in FIG. 1.

In some configurations, the engagement scheduler module 115 is configured to utilize data in the user data store 125 as targeting and ranking criteria to decide an optimal engagement type (e.g., from among the N engagement types) to send to a given user at a given time. In one example, the engagement scheduler module 115 is configured to utilize the data in the user data store 125 to filter out one or more engagement types that are no longer applicable to this user (for example, engagements that teach a user about a given feature should never be sent to users who have already used that feature successfully). Given N matching engagement types 140 for a given user, the engagement scheduler module 115 is configured to select the optimal engagement type to send to the user based on a ranking algorithm. This ranking algorithm is a function that includes, but is not limited to, historical engagements sent to the current user, historical success rates of the N engagement types 140 across various types of audiences, manually defined prioritization of engagement types, etc. As illustrated in FIG. 1, the engagement scheduler module 115 may transmit a system-generated e-mail 145 and/or in-app notification 150 to the web application 130 and/or the mobile application 135.

In one example, the engagement scheduler module 115 is configured to determine a set of users that have lapsed in usage of an application based on a respective profile of each user, determine one or more previous engagement messages sent to the determined set of users, rank a set of engagement types for each user of the determined set of users based on a set of criteria including the determined one or more previous engagement messages, and select an engagement type from among the ranked set of engagement types for each user of the determined set of users. Additionally, the engagement scheduler module is further configured to generate a new engagement message based on the selected engagement type for each user of the determined set of users, and transmit the generated new engagement message to each user of the determined set of users by utilizing one or more communication channels.

Each of the aforementioned modules illustrated in FIG. 1 may be configured to communicate between each other. For instance, different data, messages, API calls and returns can be passed between the different modules in the system 105. Also, the system 105 may communicate over a network to request and/or receive data from the web application 130 or the mobile application 135.

Figure 2:
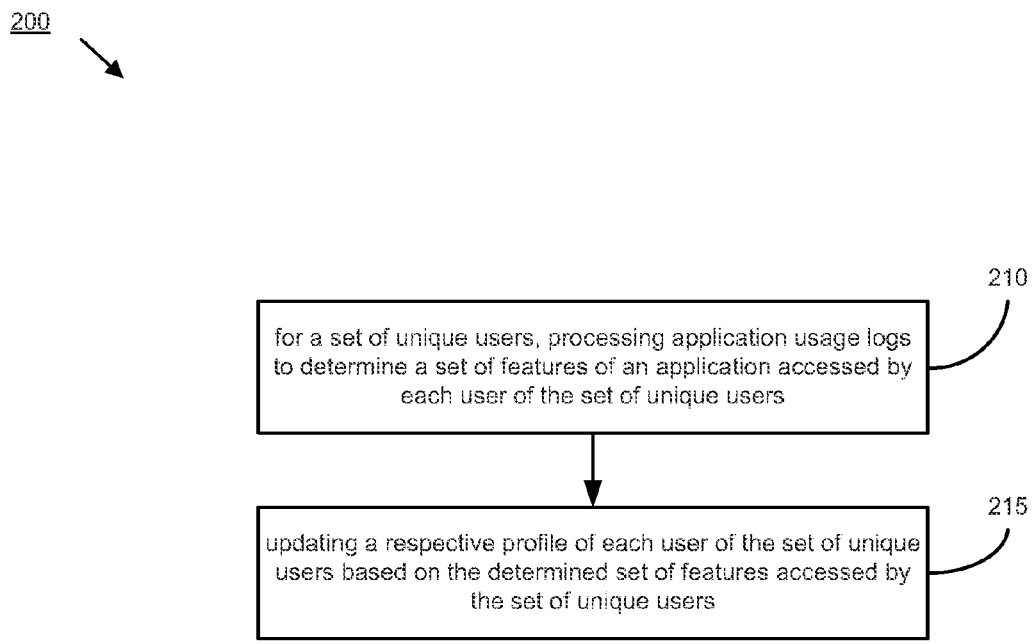
FIG. 2 conceptually illustrates an example process for iterating over application usage logs for one or more unique users of an application and updating a usage profile for each user.

FIG. 2 conceptually illustrates an example process 200 for iterating over application usage logs for one or more unique users of an application and updating a usage profile for each user. The process 200 can be performed on one or more computing devices or systems in some configurations.

The process 200 at 210 begins, for a set of unique users, by processing application usage logs to determine a set of features of an application accessed by each user of the set of unique users. The application is provided by a web site with the set of features in one example, or may be a mobile application (that may access a web site) that provides the set of features. In one example, the application usage logs are stored at a plurality of disparate data sources across a network. The application usage logs include, for instance, one or more entries of user actions performed in the application. By way of example, the application usage logs further include respective timestamps for the user actions performed in the application and a count of a number of times the user actions were performed. The user actions may include Boolean flags that indicate whether a user has used a feature from among the set of features of the application. Further, the application usage logs further include respective timestamps of page visits to the web site in some configurations.

The process 200 at 215 updates a respective profile of each user of the set of unique users based on the determined set of features accessed by the set of unique users. The respective profile of each user is stored in a user data store in one example. For new users of the application, a profile may not yet exist. In these instances, a new user profile may be created. The process 200, for example, determines if an existing profile exists for a respective user of the set of unique users, creates a new profile if the existing profile does not exist for the respective user, and stores the determined set of features accessed by the respective user in the new profile.

Figure 3:
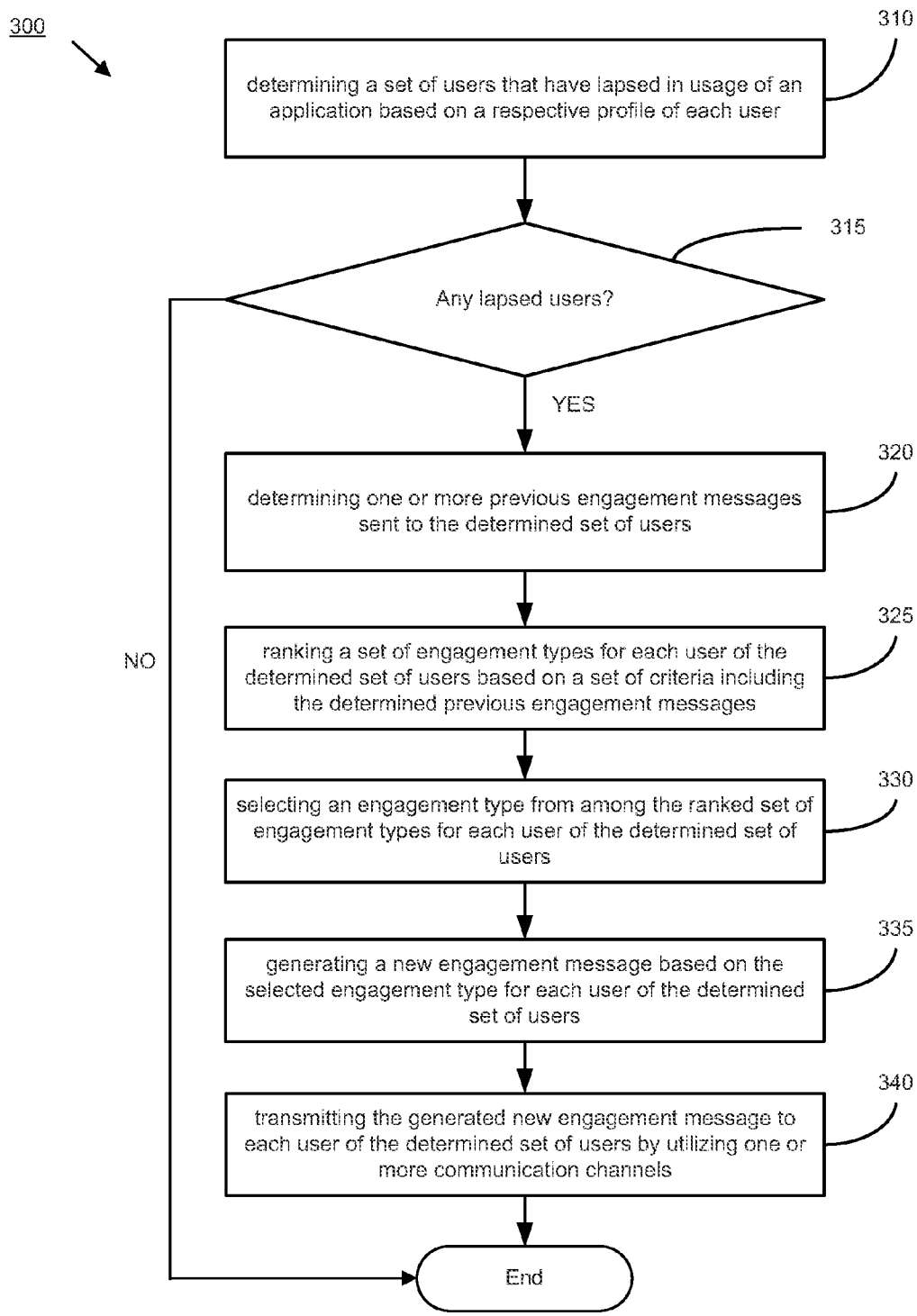
FIG. 3 conceptually illustrates an example process for utilizing user data for targeting and ranking criteria to determine a type of engagement message to send to a given user.

FIG. 3 conceptually illustrates an example process 300 for utilizing user data for targeting and ranking criteria to determine a type of engagement message to send to a given user. The process 300 can be performed on one or more computing devices or systems in some configurations.

The process 300 begins at 310 by determining a set of users that have lapsed in usage of an application based on a respective profile of each user. In some configurations, determining the set of users that have lapsed is based on a predetermined period of time. In one example, the respective profile of each user includes one or more user actions performed in the application and/or a respective timestamp for each user action, and the user actions may be represented as Boolean flags that indicate whether a user has used a feature from among a set of features of the application.

At 315, the process 300 determines if any users have lapsed based on the determination at 310. If not, the process 300 then ends. Alternatively, if the process 300 determines the set of users that have lapsed, the process 300 continues to 320.

The process 300 at 320 determines a history of previous engagement messages sent to the determined set of users. In some configurations, the history of previous engagement messages also includes a timestamp of each previous engagement message, which is used in ranking (e.g., the N engagement types receive a penalty proportional to the time elapsed since the last engagement message of that type was sent to the user). In one example, each of the previous engagement messages corresponds to a respective engagement type. For instance, the respective engagement type may be a customized message including graphics, text or auto-generated content that promotes one or more features of the application.

The process 300 at 325 ranks a set of engagement types for each user of the determined set of users based on a set of criteria including the determined history of previous engagement messages. In one example, the set of criteria further includes an indication of a number of the previous engagement messages according to engagement type that resulted in a successful engagement (e.g., click-through, user logs into the system and accesses the promoted feature(s), etc.) by a user. Previous engagement messages corresponding to respective engagement types that have been sent to the user(s) may be ranked lower than a particular engagement type(s) that has yet (or never) been sent to the user. In addition, as previously mentioned, a timestamp of each previous engagement message may be utilized in ranking by assigning a penalty proportional to the time elapsed since the last engagement message corresponding to a respective engagement type was sent to the user. Other types of criteria may be utilized and still be within the scope of the subject technology.

The process 300 at 330 selects an engagement type from among the ranked set of engagement types for each user of the determined set of users. In one example, the engagement type is selected based on a highest click-through rate among one or more features of the application. In another example, the engagement type is selected based on a respective engagement type with a highest rank or score from among all of the engagement types. For instance, a respective engagement type that has yet to be sent to the user (e.g., based on the history of previous engagement messages) may be the highest ranked engagement type in one example and, thus, be selected. The process 300 at 335 generates a new engagement message based on the selected engagement type for each user of the determined set of users.

The process 300 at 340 transmits the generated new engagement message to each user of the determined set of users by utilizing one or more communication channels. By way of example, the one or more communication channels may include at least one of an e-mail, mobile application notification, web application notification, push notification or SMS message. The process 300 then ends.

Many of the above-described features and applications are implemented as software processes that are specified as a set of instructions recorded on a non-transitory machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, disk drives, etc. The machine readable media does not include carrier waves and electronic signals passing wirelessly or over wired connections.

In this specification, the term "software" includes firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

The following description describes an example system in which aspects of the subject technology can be implemented.

Figure 4:
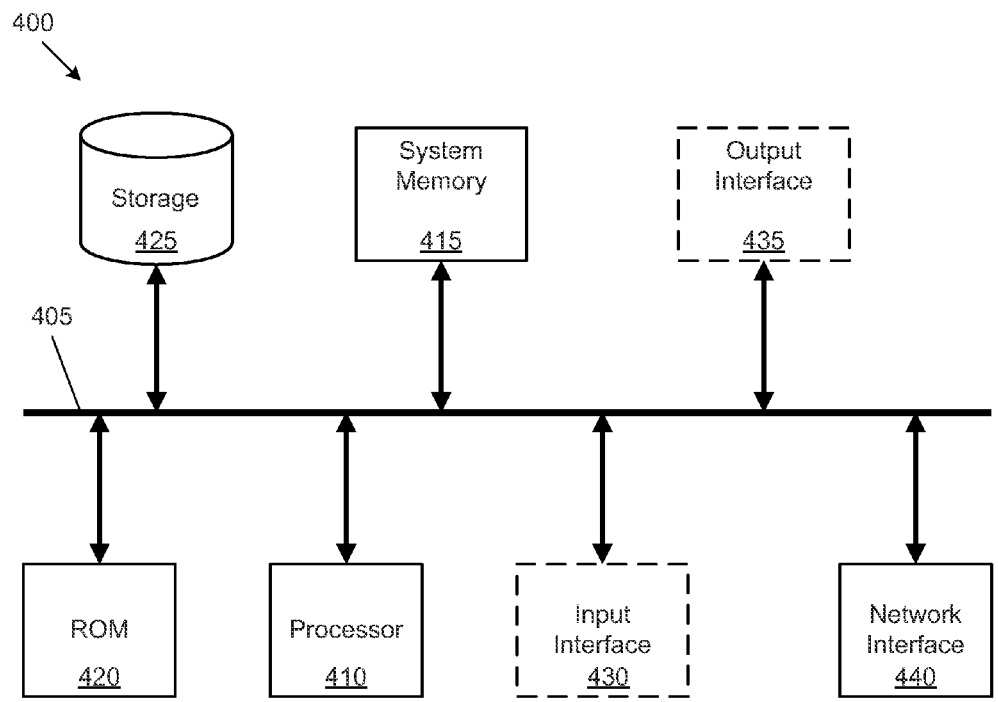
FIG. 4 conceptually illustrates a system with which some implementations of the subject technology may be implemented.

FIG. 4 conceptually illustrates a system 400 with which some implementations of the subject technology can be implemented. The system 400 can be a computer, phone, PDA, or another sort of electronic device. In some configurations, the system 400 includes a television with one or more processors embedded therein. Such a system includes various types of computer readable media and interfaces for various other types of computer readable media. The system 400 includes a bus 405, processing unit(s) 410, a system memory 415, a read-only memory 420, a storage device 425, an optional input interface 430, an optional output interface 435, and a network interface 440.

The bus 405 collectively represents all system, peripheral, and chipset buses that communicatively connect the numerous internal devices of the system 400. For instance, the bus 405 communicatively connects the processing unit(s) 410 with the read-only memory 420, the system memory 415, and the storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the system 400. The storage device 425, on the other hand, is a read-and-write memory device. This device is a non-volatile memory unit that stores instructions and data even when the system 400 is off. Some implementations of the subject technology use a mass-storage device (such as a magnetic or optical disk and its corresponding disk drive) as the storage device 425.

Other implementations use a removable storage device (such as a flash drive, a floppy disk, and its corresponding disk drive) as the storage device 425. Like the storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the subject technology's processes are stored in the system memory 415, the storage device 425, and/or the read-only memory 420. For example, the various memory units include instructions for processing multimedia items in accordance with some implementations. From these various memory units, the processing unit(s) 410 retrieves instructions to execute and data to process in order to execute the processes of some implementations.

The bus 405 also connects to the optional input and output interfaces 430 and 435. The optional input interface 430 enables the user to communicate information and select commands to the system. The optional input interface 430 can interface with alphanumeric keyboards and pointing devices (also called "cursor control devices"). The optional output interface 435 can provide display images generated by the system 400. The optional output interface 435 can interface with printers and display devices, such as cathode ray tubes (CRT) or liquid crystal displays (LCD). Some implementations can interface with devices such as a touchscreen that functions as both input and output devices.

Finally, as shown in FIG. 4, bus 405 also couples system 400 to a network interface 440 through a network adapter (not shown). In this manner, the computer can be a part of a network of computers (such as a local area network ("LAN"), a wide area network ("WAN"), or an Intranet, or an interconnected network of networks, such as the Internet. The components of system 400 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a non-transitory machine-readable or non-transitory computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to non-transitory tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

What is claimed is:

1. A machine-implemented method, the method comprising:
   determining a set of users that have lapsed in usage of an application for a predetermined period of time based on a respective profile of each user in the set of users, wherein the application comprises a plurality of features;
   determining one or more previous engagement messages sent to the determined set of users;
   for at least one user of the determined set of users:
      ranking a set of engagement types based on a set of criteria, the ranking of each engagement type of the set of engagement types being adjusted by an amount of penalty that is proportional to an amount of time elapsed since a time of a last engagement message among the determined one or more previous engagement messages was sent to the at least one user for the engagement type;
      selecting an engagement type from among the ranked set of engagement types;
      generating a new engagement message based on the selected engagement type and user activity with respect to one or more of the plurality of features of the application; and
      transmitting the generated new engagement message over one or more communication channels to a client device associated with the at least one user of the determined set of users.

2. The method of claim 1, wherein each of the previous engagement messages corresponds to a respective engagement type.

3. The method of claim 2, wherein the respective engagement type comprises a customized message including graphics, text or auto-generated content that promotes one or more of the plurality of features of the application.

4. The method of claim 2, wherein the set of criteria further includes an indication of a number of the previous engagement messages according to engagement type that resulted in a successful engagement by the user.

5. The method of claim 2, wherein the engagement type is selected based on a highest click-through rate among one or more of the plurality of features of the application.

6. The method of claim 2, wherein the one or more communication channels comprise one of an e-mail, mobile application notification, web application notification, push notification or SMS message.

7. The method of claim 2, wherein the set of criteria further includes an indication of a number of the previous engagement messages according to engagement type that resulted in a successful engagement by one or more other users of the determined set of users.

8. The method of claim 1, wherein the respective profile of each user includes one or more user actions performed in the application.

9. The method of claim 8, wherein the user actions comprise Boolean flags that indicate whether a user has used a feature from among the plurality of features of the application.

10. The method of claim 1, wherein the application is provided by a web site.

11. The method of claim 1, wherein the respective profile of each user is stored in a user data store.

12. The method of claim 1, wherein the application corresponds to an online social network system.

13. A system, the system comprising:
   memory;
   one or more processors;
   one or more modules stored in memory and configured for execution by the one or more processors, the modules comprising:
      a user data aggregator module configured to, for a set of unique users:
         process application usage logs to determine a set of features of an application accessed by each user in the set of unique users, and
         update a respective profile of each user in the set of unique users based on the determined set of features accessed by the set of unique users, wherein the application comprises a plurality of features; and
      an engagement scheduler module configured to:
         determine a set of users that have lapsed in usage of an application for a predetermined period of time based on a respective profile of each user,
         determine one or more previous engagement messages sent to the determined set of users,
         for at least one user of the determined set of users:
            rank a set of engagement types based on a set of criteria, the ranking of each engagement type of the set of engagement types being adjusted by an amount of penalty that is proportional to an amount of time elapsed since a time of a last engagement message among the determined one or more previous engagement messages was sent to the at least one user for the engagement type,
            select an engagement type from among the ranked set of engagement types, and
            generate a new engagement message based on the selected engagement type and user activity with respect to one or more of the plurality of features of the application.

14. The system of claim 13, wherein the engagement scheduler module is further configured to transmit the generated new engagement message over one or more communication channels to a client device associated with the at least one user of the determined set of users.

15. A non-transitory machine-readable medium comprising instructions stored therein, which when executed by a machine, cause the machine to perform operations comprising:

determining a set of users that have lapsed in usage of an application for a predetermined period of time based on a respective profile of each user, wherein the application comprises a plurality of features;

determining one or more previous engagement messages sent to the determined set of users;

for at least one user of the determined set of users:

ranking a set of engagement types based on a set of criteria, the ranking of each engagement type of the set of engagement types being adjusted by an amount of penalty that is proportional to an amount of time elapsed since a time of a last engagement message among the determined one or more previous engagement messages was sent to the at least one user for the engagement type;

selecting an engagement type from among the ranked set of engagement types generating a new engagement message based on the selected engagement type and user activity with respect to one or more of the plurality of features of the application; and transmitting the generated new engagement message over one or more communication channels to a client device associated with the at least one user of the determined set of users.

16. The non-transitory machine-readable medium of claim 15, wherein each of the previous engagement messages corresponds to a respective engagement type.

17. The non-transitory machine-readable medium of claim 16, wherein the respective engagement type comprises a customized message including graphics, text or auto-generated content that promotes one or more features of the application.

18. The non-transitory machine-readable medium of claim 16, wherein the set of criteria further includes an indication of a number of the previous engagement messages according to engagement type that resulted in a successful engagement by a user.

19. The non-transitory machine-readable medium of claim 16, wherein the engagement type is selected based on a highest click-through rate among one or more of the plurality of features of the application.

* * * * *